United States Patent [19]
Bekker

[11] 3,866,701
[45] Feb. 18, 1975

[54] GROUND SUPPORT UNIT
[76] Inventor: Peter O. E. Bekker, 23 Upland Ln., Armonk, N.Y. 10504
[22] Filed: May 21, 1973
[21] Appl. No.: 362,532

[52] U.S. Cl............................. 180/14 C, 180/53 B
[51] Int. Cl............................................. B60d 1/16
[58] Field of Search .... 180/14 R, 14 C, 53 R, 53 B; 244/137 R, 17.15

[56] References Cited
UNITED STATES PATENTS
| | | | |
|---|---|---|---|
| 2,448,172 | 8/1948 | Couse | 180/14 C |
| 2,941,611 | 6/1960 | Norrie | 180/14 C |
| 3,038,550 | 6/1962 | Lehmann et al. | 180/14 C |
| 3,042,385 | 7/1962 | Smith | 244/137 R X |
| 3,450,376 | 6/1969 | Rusanovich et al. | 244/137 R |

Primary Examiner—M. Henson Wood, Jr.
Assistant Examiner—Michael Mar
Attorney, Agent, or Firm—Sherman & Shalloway

[57] ABSTRACT

A ground support unit for servicing aircraft including a tractor unit with a hydrostatic transmission, an engine-starting power-pack mounted behind the rear axle opposite from the tractor engine, lift hooks for transport of the entire unit via helicopter, and a pintle hook mounted below the drive-axle level and adjacent the power pack to provide stability in towing aircraft.

7 Claims, 6 Drawing Figures

3,866,701

GROUND SUPPORT UNIT

BACKGROUND OF THE INVENTION

The history of ground support equipment for aircraft has always been one of specialization. Units were developed for specific purposes such as auxiliary power sources, tug and towing requirements, cargo loading and unloading, battery recharging, starting and starting boost, ramp sweepers and magnetic cleaners.

In addition to being specialized, the units were generally designed to operate within the confines of an airport. For this purpose they were either bulky and not very maneuverable, or required a smooth surface such as a ramp, taxiway, or runway on which to operate. Since battery recharging and most maintenance and repair work was done inside a hangar, there was no requirement for many of the units to be mobile. Battery re-chargers were generally bench models, while auxiliary power units were towed to the aircraft or carried by two or more mechanics. There were tugs and starter units that were mobile and could operate on the ramp or in the hangar but could not operate off the cement surfaces.

The small and marginal operator, who could not afford to have a full range of support equipment, could depend only on the Fixed Base Operator or a neighbor to lend or rent him the units that he would require.

While aircraft operations were conducted from airfields, this state of affairs was adequate. But with the advent of helicopter and VSTOL or VTOL operations, less and less reliance was put on airfield operations, and more flights either originated from or terminated in off-airport locations such as forests, construction sites, offshore oil rigs, hospital or dispensary parking lots, etc. It became evident that, should the helicopter require servicing, a problem existed in terms of availability of equipment of the right sort.

It is obvious that it would be uneconomical to station five or six different kinds of support units at remote areas which are, in most cases, unprotected or, at best, too small to hold all of them. It is also evident that selection of the right kind of equipment to post at the proper remote site would be a problem. When flights began and terminated at airports each airport was fully equipped or had adequate equipment available. Not so with the remote sites. The questions of which point should the auxiliary power unit be stationed; at which site the tug should be; and which point at which the battery recharger would be most needed, are problems whose answers could not be foreseen reliably. Obviously it would be too costly to station these units at various places only to have them sit idle most of the time.

BRIEF DESCRIPTION OF THE PRIOR ART

A need exists, therefore, for a unit that can accomplish most of the requirements of ground support in remote, off-airport, and unusual situations. A thorough investigation of the market and existing technology, showed that no such unit was in existence. There are units that are a combination of tug and starter; units that are nominally-portable in the sense that they are built on a trailer device that must be towed by a separate tug and there are units that are self-propelled and can do ramp maintenance but cannot act as a tug or start engines.

SUMMARY OF THE INVENTION

In general, the preferred form of the present invention comprises a compact, estate-type tractor including an engine, a hydrostatic transmission, a drive axle and a steering mechanism.

Engine-starting means are mounted behind the drive axle, on the opposite side thereof from the tractor engine, and a towing coupling is mounted adjacent the engine-starting means below the level of the rear axle.

Lifting means or hooks are positioned at a purality of positions about the unit to facilitate transport thereof by a helicopter.

A better understanding of the invention may be derived from the following description and accompanying drawings, in which.

DESCRIPTION OF THE PREFERRED EMBODIMENT

Figure 1:
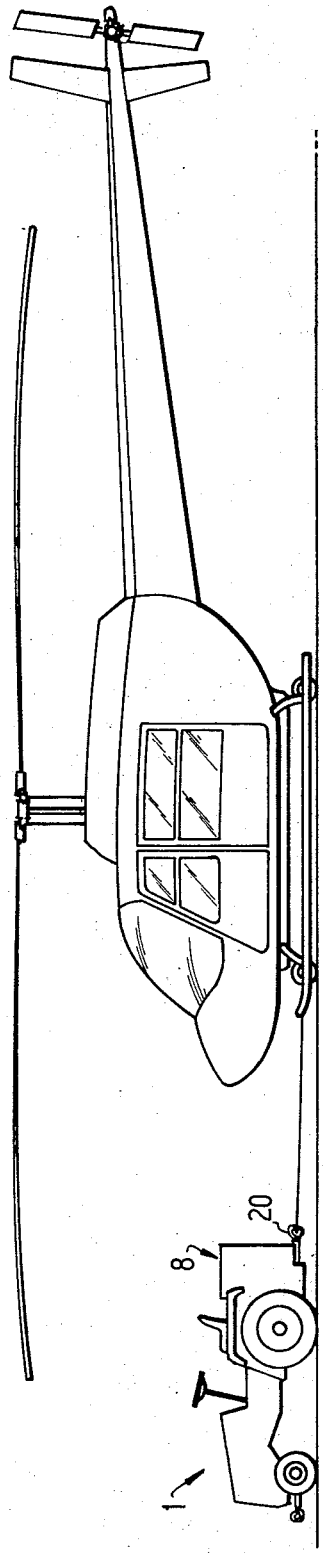
FIG. 1 is a side view of the unit in service as a tug.
Figure 2:
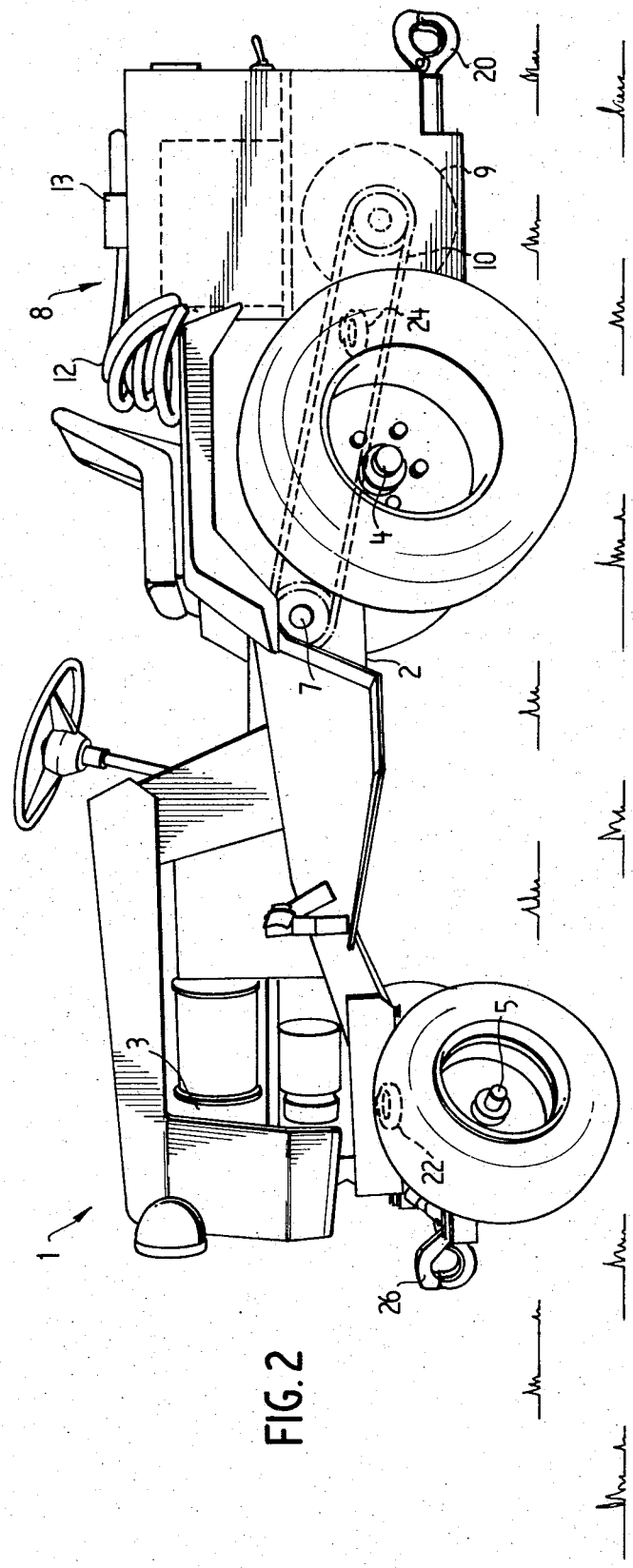
FIG. 2 is a perspective view, on an enlarged scale, of the unit itself.
Figure 3:
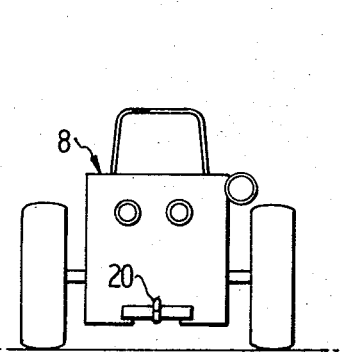
FIG. 3 is a rear view of the unit of FIG. 2.

As shown in the drawings, the preferred form of the invention comprises a tractor 1 having a frame 2, an engine 3, a rear driving-axle 4, a front steering-axle 5, and the usual features of such vehicles.

The rear axle 5 receives power from the engine 3 via a hydrostatic transmission 6. A power take-off is provided in the drive train between the engine 3 and the hydrostatic transmission 6 to provide continuous power, during operation of the engine 3, independently of the selected output of the transmission 6.

An aircraft-engine starting unit 8 is secured behind the rear axle 4, preferably by weldment to the frame 2 or the accessory-mounts (not shown) of the frame. The starting unit 8 includes a generator 9, which is driven from the power-takeoff 7 by suitable means such as a V-belt drive 10. The generator 9 serves a battery 11 and a starting-cable 12. The starting cable 12 terminates in a connector 13 for engaging the starting terminals of aircraft.

Figure 4:
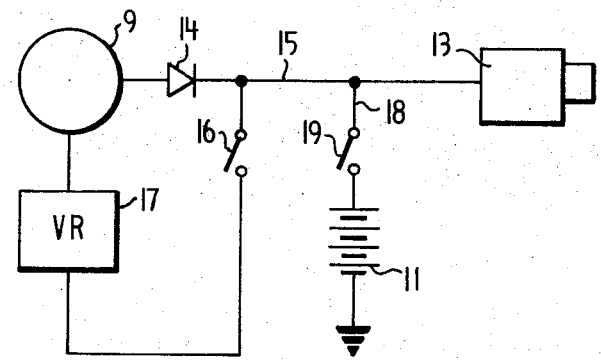
FIG. 4 is a schematic diagram of the engine starting unit.

It is to be understood that several different combinations of starting-unit components may be employed. However, I have found the combination shown in FIG. 4 to be particularly advantageous. As shown in that Figure, the alternator or generator 9 serves the connector 13 via a diode 14 in a line 15, and is controlled in its output by a generator on-off switch 16 feeding a voltage regulator 17. A branch line 18 communicates with the battery 11 via a battery on-off switch 19.

This combination permits the supply of starting power, through the coupling 13, from either or both the generator 9 and the battery 11. Also, it makes it possible to maintain the battery 11 at full charge while the unit is being used as a tug or in any of its other services.

Figure 5:
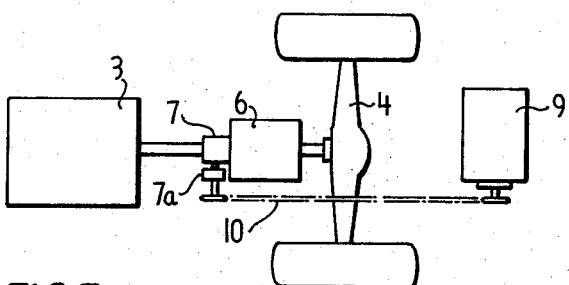
FIG. 5 is a schematic view of the power train of the unit.

This power train of the unit is of particular importance in maintaining the starting-unit battery 11 at full charge. As best shown in FIG. 5, the power takeoff 7 is driven directly by the motor 3 and is controlled only by a clutch 7a. Since the hydrostatic transmission 6 is infinitely variable, the engine 3 is then free to operate at a chosen RPM best suited to torque and, via selection of the sheaves of the belt drive 10, to the requirements of the generator 9, regardless of the groundspeed required. Therefore, the generator is preferentially kept in its optimum RPM range whether the unit is in service as a tug, ramp-sweeper, snowplow, weed mower, or any other service for which it may be required.

Figure 6:
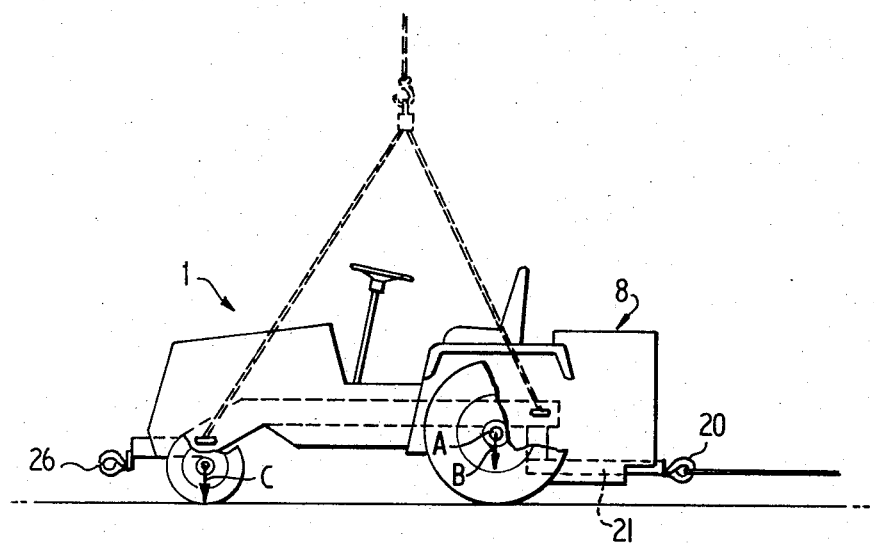
FIG. 6 is a schematic view similar to FIG. 1 and showing the force vectors on the unit when it is pulling a helicopter.

As regards its service as a tug, the ground support unit of the invention is surprisingly effective for its size and weight. As best shown in FIG. 6, a rear pintle hook 20 is mounted on a frame 21 which is rididly mounted on the tractor frame 2 to position the rear pintle hook at a level B below the axis A of the drive axle 4.

When the unit is in service as a tug, the load force on the pintle hook 20 is effective through the force arm A-B to cause a downward loading C on the front wheels, thereby preventing any tendency of the front end to lift away from steering traction and, most importantly, preventing the tractor from "rearing" or walking out from under the load.

The stability of the unit, both while pulling heavy loads and while being aerially transported by a helicopter, is a function of the balance which has been achieved in the unit as a result of the placement of the rear pintle hook 20. Location of the engine-starting unit forward of the rear axle would help to counteract rearing of the unit when it acts as a tug, but would ruin the lifting balance. Location of the engine starting unit behind the rear axle serves to balance the unit for aerial lifting, but aggravates the rearing problem, since it adds weight on the "wrong" side of the drive axle.

However, by the provision of a torquing-mount for the rear pintle hook below the drive axle, I am able to achieve the reliable stability in both lifting the unit and in using it as a tug for aircraft.

Therefore, I am able to provide lifting hooks or eyes 22, on opposite sides of the front of the unit, and either a central hook at the rear or a pair of hooks 24, on opposite sides of the rear of the unit. These permit a helicopter to self-transport its own ground support unit, rather than depending on multiple installations or highway or access-roads to remote sites.

In addition to the rear pintle hook 20, I provide a front pintle hook 26 which preferably is readily demountable.

The normal sweeping, snowplowing, mowing or other attachments may then be installed for ramp and site maintenance service.

Various changes may be made in the details of the invention as described without sacrificing the advantages thereof or departing from the scope of the appended claims.

I claim:

1. A ground support vehicle for supporting and transport by aircraft including
   a rear axle,
   a forward axle,
   an engine mounted adjacent said front axle,
   engine starting means mounted adjacent said rear axle on the side thereof remote from said engine,
   coupling means for engaging and moving aircraft, said coupling means including
   a coupling positioned below said engine-starting means and mounted on said vehicle on a plane below the level of the rear axle and
   lifting means distributed on said vehicle for engagement and transport by aircraft.

2. A ground support vehicle according to claim 1 including power transmission means for delivering power from said engine to said engine-starting means.

3. A ground support vehicle according to claim 1 in which said coupling means includes a coupling adjacent said forward axle.

4. A ground support vehicle according to claim 1 in which said lifting means includes a pair of lift members positioned adjacent said front axle and on opposite sides of said engine, and at least one rear lift member adjacent said rear axle.

5. A ground support vehicle according to claim 4 in which said lifting means includes a pair of rear lift members on opposite sides of said engine-starting means.

6. A ground support vehicle according to claim 2 in which said engine-starting means includes a generator, a storage battery, and a power cable.

7. A ground support vehicle according to claim 6 in which said power transmission means includes a hydrostatic transmission in driving engagement with said rear axle, a power takeoff in said power transmission means intermediate said engine and said hydrostatic transmission, and means for delivering power from said power takeoff to said generator.

* * * * *